United States Patent
Iida et al.

(10) Patent No.: US 6,846,266 B2
(45) Date of Patent: Jan. 25, 2005

(54) HYDRAULIC PRESSURE CONTROL SYSTEM FOR BELT-TYPE CONTINUOUSLY VARIABLE TRANSMISSION

(75) Inventors: Toshiji Iida, Sagamihara (JP); Makoto Sawada, Atsugi (JP)

(73) Assignee: Jatco Ltd. (JP)

( * ) Notice: Subject to any disclaimer, the term of this patent is extended or adjusted under 35 U.S.C. 154(b) by 0 days.

(21) Appl. No.: 10/234,483

(22) Filed: Sep. 3, 2002

(65) Prior Publication Data

US 2003/0050149 A1 Mar. 13, 2003

(30) Foreign Application Priority Data

Sep. 12, 2001 (JP) ........................................ 2001-276158

(51) Int. Cl.[7] .............................................. B60K 41/12
(52) U.S. Cl. ........................................................ 477/44
(58) Field of Search ............................. 477/44, 45, 46, 477/48, 49

(56) References Cited

U.S. PATENT DOCUMENTS

| | | | | |
|---|---|---|---|---|
| 5,885,186 | A | * | 3/1999 | Van Wijk et al. ......... 477/45 X |
| 6,050,917 | A | * | 4/2000 | Gierling et al. ............... 477/45 |
| 6,454,675 | B2 | * | 9/2002 | Asayama et al. .............. 477/45 |
| 6,547,694 | B2 | * | 4/2003 | Miyagawa et al. ........... 477/45 |

FOREIGN PATENT DOCUMENTS

| | | | |
|---|---|---|---|
| JP | 08210453 | * | 8/1996 |
| JP | 11-082725 | | 3/1999 |
| JP | 2001-263474 | | 9/2001 |

* cited by examiner

*Primary Examiner*—Roger Pang
(74) *Attorney, Agent, or Firm*—Klarquist Sparkman, LLP

(57) ABSTRACT

A hydraulic pressure control system for a belt-type continuously variable transmission including a speed ratio control mechanism composed of two variable pulleys each having a belt groove with a width that can be changed according to a hydraulic pressure, and a belt member passed over the variable pulleys in engagement with the belt grooves of the variable pulleys so as to transmit a power therebetween. The hydraulic pressure control system includes a line pressure control means for controlling a line pressure supplied to one of the variable pulleys; and a speed ratio control pressure control means for controlling the line pressure as a speed ratio change pressure supplied to the other of the variable pulley according to a desired speed ratio. The line pressure control means includes a detecting means for detecting whether or not an actual speed ratio has reached the desired speed ratio, and operable to lower the line pressure if the first detecting means detects that the actual speed ratio has reached the desired speed ratio.

12 Claims, 4 Drawing Sheets

HYDRAULIC PRESSURE CONTROL SYSTEM FOR BELT-TYPE CONTINUOUSLY VARIABLE TRANSMISSION

BACKGROUND OF THE INVENTION

1. Field of the Invention

The present invention relates to a hydraulic pressure control system for a belt-type continuously variable transmission suitable for continuously changing the speed ratio by means of a belt member passed over two variable pulleys each having a belt groove with a width that is variable according to a hydraulic pressure applied to the pulley.

2. Description of Related Art

Such a hydraulic pressure control system for a belt-type continuously variable transmission is disclosed, e.g., in JP 11-82725A or JP 2001-263474A, of which the latter became publicly available after the priority date of the present application. In the hydraulic control system as known from these patent documents, when the speed ratio of the belt-type continuously variable transmission is changed to the high speed side, it is judged whether or not the desired change is actually attained. If it is judged that that the desired change of the speed ratio to the high speed side is not attained, the line pressure is increased until the desired change is attained. Typically, the line pressure is set to a low value in order to eliminate drawbacks caused by a high line pressure, such as energy loss due to excessively high hydraulic pressure discharged from an oil pump, or degraded fuel consumption due to frictional loss between the belt member and the variable pulleys, as a result of excessive force with which the belt member is clamped by the variable pulleys.

However, since the line pressure is usually set with some margin in consideration of dimensional fluctuation of the components, even when a desired speed ratio as determined according to an operating condition is attained, there may be instances wherein the hydraulic pressure control system is supplied with a line pressure that is higher than the minimum pressure allowing power transmission by the belt member.

SUMMARY OF THE INVENTION

It is therefore an object of the present invention to provide a hydraulic pressure control system for a belt-type continuously variable transmission, which effectively eliminates drawbacks caused when an excessively high line pressure is supplied while an actual speed ratio of the transmission is attaining the desired speed ratio.

To this end, according to the present invention, there is provided a hydraulic pressure control system for a belt-type continuously variable transmission including a speed ratio control mechanism composed of two variable pulleys each having a belt groove with a width that can be changed according to a hydraulic pressure, and a belt member passed over the variable pulleys in engagement with the belt grooves of the variable pulleys so as to transmit power therebetween; wherein said hydraulic pressure control system comprises a line pressure control means for controlling a line pressure supplied to one of the variable pulleys; and a speed ratio control pressure control means for controlling the line pressure as a speed ratio change pressure supplied to the other of the variable pulley according to a desired speed ratio; said line pressure control means comprising a first detecting means for detecting whether or not an actual speed ratio has reached the desired speed ratio, and operable to lower the line pressure if the first detecting means detects that the actual speed ratio has reached the desired speed ratio.

With the above-mentioned control system according to the present invention, it is detected whether the actual speed ratio has reached the desired speed ratio, and the line pressure is lowered if the detected result is affirmative. Thus, while the actual speed ratio is attaining the desired speed ratio, the line pressure supplied to the variable pulleys can be maintained at a low level. This makes it possible to effectively eliminate drawbacks as a result of excessively high line pressure supplied while an actual speed ratio of the transmission is attaining the desired speed ratio, such as energy loss or degraded fuel consumption, as mentioned above.

It is preferred that the line pressure control means returns a current line pressure to a previous line pressure if the first detecting means does not detect that the actual speed ratio reached the desired speed ratio. In this instance, it is possible to maintain the line pressure at a low level that allows the actual speed ratio to attain the desired speed ratio while minimizing degradation of fuel consumption, and also ensuring a stable control of the speed ratio to be carried out at any time.

It is preferred that the line pressure control means further comprises a second detecting means for detecting whether or not a displacement position of a step motor for controlling the speed ratio control pressure is within a predetermined range, so as to prohibit lowering of the line pressure if the second detecting means detects that the displacement position of the step motor is out of the predetermined range, even if the first detecting means detects that the actual speed ratio has reached the desired speed changer ratio. In this instance, the lowering of the line pressure is prohibited in anticipation of change in the groove width of the variable pulley, which would be caused if the line pressure were lowered, giving priority to maintenance of the current situation wherein the actual speed ratio is attaining the desired speed ratio, rather than to improvement in the fuel consumption, thereby ensuring a stable speed ratio control not only during the current control present operation but also during subsequent control operations.

It is preferred that the line pressure control means is adapted to change a drop margin for lowering the line pressure, according to transmission operating conditions. In this instance, since the line pressure can be rapidly lowered according to the transmission operating conditions, a longer operation time can be ensured with a low line pressure, thereby improving the fuel consumption.

The line pressure control means may be so designed as to increase the drop margin according to increase in a vehicle speed. In this instance, the line pressure is lowered primarily in a high speed driving range where the improvement in fuel consumption is important.

It is preferred that a lower limit value is set for lowering the line pressure. In this instance, it is possible to lower the line pressure supplied to the variable pulleys and thereby eliminate the drawbacks that arise from high line pressure supplied while the current speed ratio is attaining the desired speed ratio, and also to supply line pressure meeting with various requirements imposed depending upon specification of vehicles, by appropriately changing the lower limit value for lowering the line pressure. When, in particular, the lower limit value for lowering the line pressure is set to a minimum pressure that allows power transmission by the belt member between the two variable pulleys, it is possible to prevent the line pressure from lowering to a level insufficient to attain the desired speed ratio. Since at least the desired speed ratio can be positively attained, it is possible to produce a stable control of the speed ratio.

BRIEF DESCRIPTION OF THE DRAWINGS

The present invention will be further explained below with reference to preferred embodiments shown in the accompanying drawings.

DETAILED DESCRIPTION OF THE PREFERRED EMBODIMENT

Figure 1:
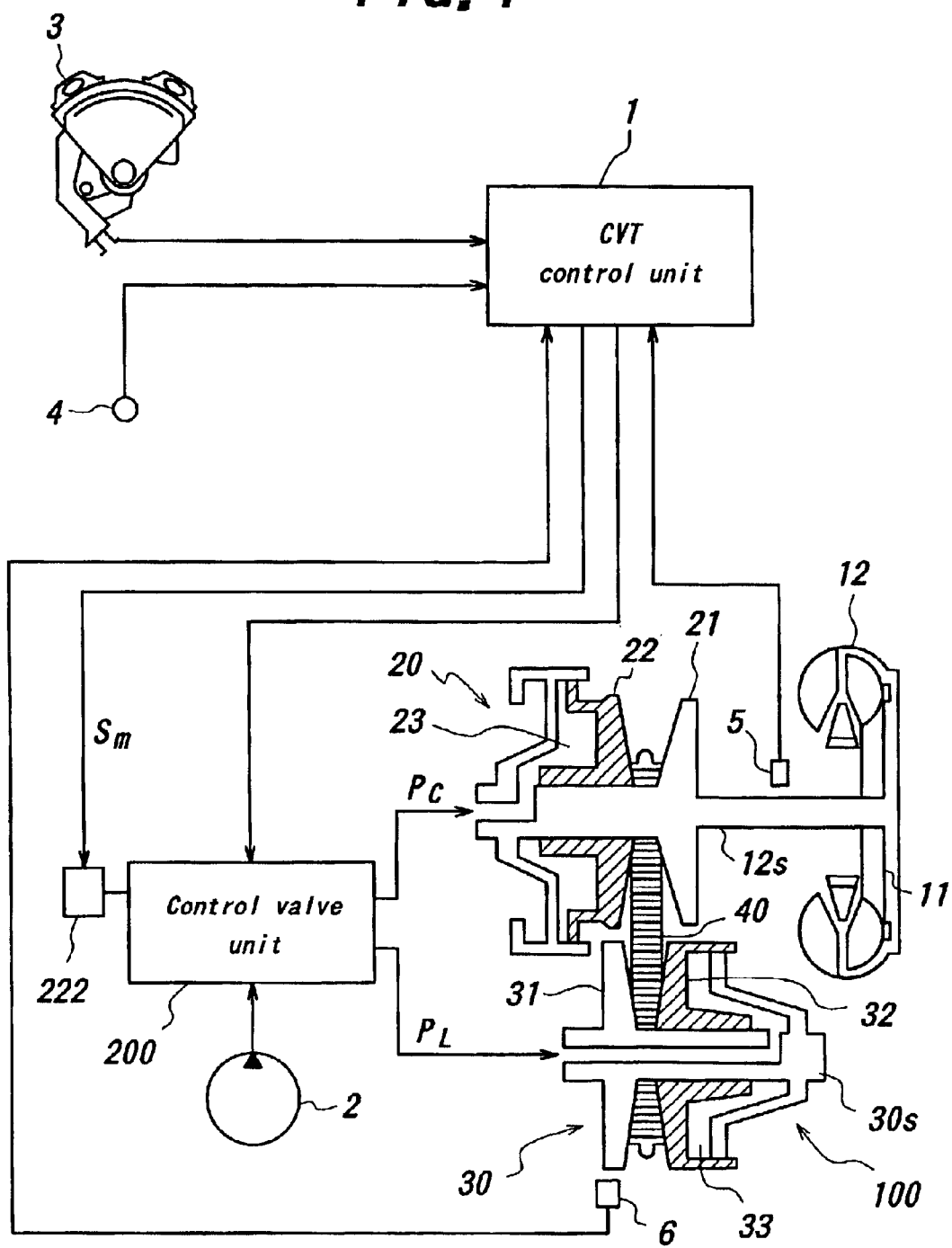
FIG. 1 is a schematic diagram showing a hydraulic pressure control system for a belt-type continuously variable transmission according to one embodiment of the present invention.

A belt-type continuously variable transmission (CVT) is schematically shown in FIG. 1 and comprises a speed ratio changing mechanism 100 for carrying out continuous change of the speed ratio according to a desired speed ratio $I_0$ that is determined depending upon transmission operating conditions, a control valve unit 200 for controlling a line pressure $P_L$ to be supplied to a primary pulley 20 and a speed ratio control pressure $P_c$ to be supplied to a secondary pulley 30, according to the desired speed ratio $I_0$. It is assumed that the control valve unit 200 for supplying the line pressure $P_L$ and the speed ratio control pressure $P_c$ is controlled by appropriate CVT control unit 1.

The speed ratio changing mechanism 100 is essentially composed of the primary pulley 20 and the secondary pulley 30. The primary pulley 20 receives engine power from an engine (not shown), via a torque converter 12 incorporating a lock-up clutch 11, and transmits the engine power to the secondary pulley 30 through an endless V-belt 40 made of metal, which is passed over the primary and secondary pulleys 20, 30.

The primary pulley 20 is a variable pulley including a stationary conical disk 21 that is integrally rotated together with an output shaft 12s of the torque converter 12, and a movable conical disk 22 that is opposed to the stationary disk 21 and movable along the output shaft 12s. The speed ratio control pressure $P_c$ from the control valve unit 20 is supplied to a cylinder chamber 23 of the primary pulley 20 formed on the rear surface side of the movable disk 22.

Similarly, the secondary pulley 30 is a variable pulley including a stationary conical disk 31 integrally rotated with an output shaft 30s coupled to an axle (not shown), and a movable conical disk 32 that is opposed to the stationary disk 31 so as to be urged toward the latter by a return spring (not shown) and movable along the output shaft 30s. The line pressure $P_L$ from the control valve unit 200 is supplied to a cylinder chamber 33 of the secondary pulley 30 formed on the rear surface side of the movable disk 32.

The speed ratio control pressure $P_c$ supplied to the cylinder chamber 23 in the primary pulley 20 is variable and serves to change the groove width of the primary pulley 20. On the other hand, the line pressure $P_L$ supplied to the cylinder chamber 33 in the secondary pulley 30 is essentially constant and serves to control the clamping pressure for the V-belt 40 so as to allow power transmission by the V-belt 40, from the primary pulley 20 to the secondary pulley 30.

To be more specific, if the groove width of the primary pulley 20 is increased by decreasing the speed ratio control pressure $P_c$, the contact radius of the primary pulley 20 with the V-belt 40 is decreased, though the contact radius of the secondary pulley 30 with the V-belt 40 is maintained unchanged since the line pressure $P_L$ is essentially constant. A low pulley ratio for low speed side is thus achieved, whereby the speed ratio of the transmission is increased so that a primary rotation speed $N_{pri}$ of the primary pulley 20 or the engine rotation speed is reduced and the secondary rotation speed $N_{sec}$ of the secondary pulley 30 or the axle rotation speed is decreased. On the contrary, if the groove width of the primary pulley 20 is decreased by increasing the speed ratio control pressure $P_c$, the contact radius of the primary pulley 20 is increased, though the contact radius of the secondary pulley 30 is maintained unchanged. A high pulley ratio for high speed side is thus achieved, whereby the speed ratio of the transmission is decreased so that the primary rotation speed $N_{pri}$ or the engine rotation speed is increased and the secondary rotation speed $N_{sec}$ or the axle rotation speed is increased.

In this way, the speed ratio changing mechanism 100 serves to continuously change the speed ratio according to the ratio of the contact radius between the primary pulley 20 and the second pulley 30. It is noted that the pressure receiving area of the cylinder chamber 23 in the primary pulley 20 is made larger than that of the cylinder chamber 33 in the secondary pulley 30.

Figure 2:
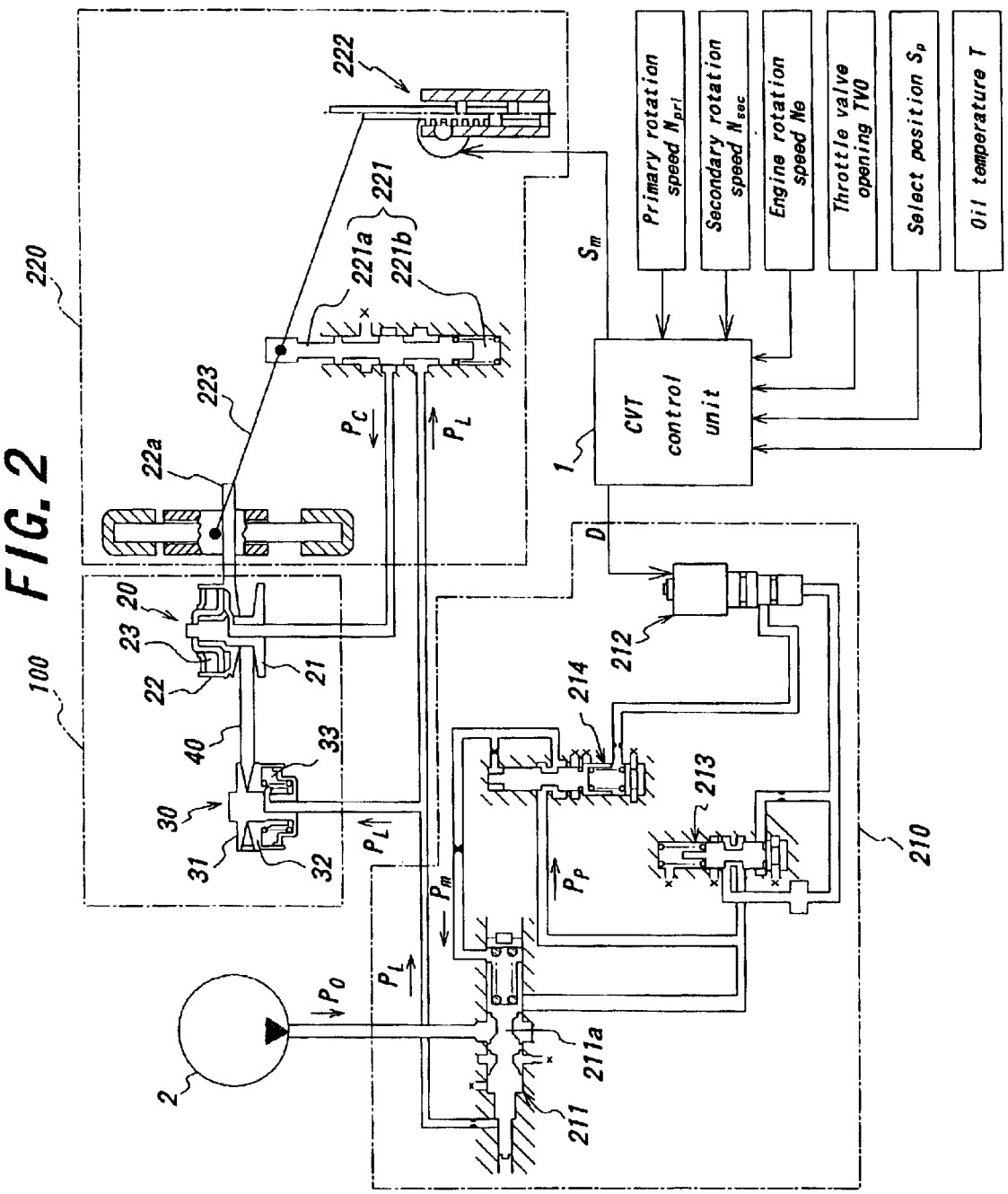
FIG. 2 is a schematic diagram illustrating the hydraulic pressure control device in the embodiment of FIG. 1.

As particularly shown in FIG. 2, the control valve unit 200 includes a pressure control section 210 for controlling the line pressure $P_L$ supplied to the cylinder chamber 33 in the secondary pulley 30 according to the desired speed ratio $I_0$, as well as another pressure control section 220 for controlling the speed ratio control pressure $P_c$ supplied to the cylinder chamber 23 in the primary pulley 20 according to the desired speed ratio $I_0$, wherein the speed ratio control pressure $P_c$ uses the line pressure $P_L$ as a source pressure.

The pressure control section 210 for the line pressure $P_L$ includes a line pressure regulator valve 211, a line pressure solenoid 212, a pilot valve 213 and a pressure modifier valve 214. The line pressure regulator valve 211 serves to control a pump discharge pressure $P_0$ from the oil pump 2 to generate the line pressure $P_L$ according to the desired speed ratio $I_0$. The line pressure regulator valve 211 also serves to supply the line pressure $P_L$ to the cylinder chamber 33 of the secondary pulley 30 and to a speed ratio control valve 221 to be described hereinafter. The line pressure solenoid 212 is controlled by the CVT control unit 1. The pilot valve 213 serves to adjust the pump discharge pressure $P_0$ passed through the line pressure regulator valve 211 to generate a pilot pressure $P_p$. Finally, the pressure modifier valve 214 serves to modify the pilot pressure $P_p$ from the pilot valve 213 to generate a modified pressure $P_m$, which is supplied to the line pressure regulator valve 211.

The pressure control section 220 for the speed ratio control pressure $P_c$ includes a speed ratio control valve 221 and a step motor 222 for driving the speed ratio control valve 221. The speed ratio control valve 221 serves to control the line pressure $P_L$ as a source pressure from the line pressure regulator valve 211 to generate the speed ratio control pressure $P_c$ according to the desired speed ratio $I_0$. The speed ratio control valve 221 also serves to supply the speed ratio control pressure $P_c$ to the cylinder chamber 23 of the primary pulley 20. The step motor 222 drives the speed ratio control valve 221 which includes a spool 221a slidably accommodated in a casing 221b of the speed ratio control valve 221. A link member 223 is connected to a feedback member 22a for feeding back the displacement of the movable disk 22.

The CVT control unit 1 receives signals indicating various operating conditions of the belt-type continuously variable transmission, such as engine speed $N_e$, primary rotation speed $N_{pri}$ detected by a primary speed sensor 5, secondary rotation speed $N_{sec}$ detected by a secondary speed sensor 6, select position $S_p$ of the transmission detected by an inhibitor switch 3, throttle valve opening degree TVO detected by a throttle opening degree sensor 4, oil temperature T, etc.

Next, explanation will be made of control methods for the line pressure $P_L$ and the speed ratio control pressure $P_c$.

First, the control unit 1 estimates an engine torque Te from the engine rotational speed $N_e$, and computes the desired speed ratio I0 from the select position signal Sp, the throttle valve opening degree TVO and the engine torque $T_e$. Further, the control unit 1 calculates the line pressure $P_L$ and the speed ratio control pressure $P_c$ from the desired speed ratio $I_0$, and delivers a duty ratio signal D corresponding to the line pressure $P_L$ to the line pressure solenoid 212 and also delivers a pulse signal $S_m$ corresponding to the speed ratio control pressure $P_c$ based on the desired speed ratio $I_0$ to the step motor 222.

The line pressure control section 210 controls the line pressure solenoid 212 according to the duty ratio signal D from the control unit 1 so as to regulate the pilot pressure $P_p$ from the pilot valve 213 to the modified pressure $P_m$ by means of the pressure modifier valve 214 so that the spool 211a of the line pressure regulator valve 211 is driven by the modified pressure $P_m$. Accordingly, the line pressure regulator valve 211 controls the pump discharge pressure $P_0$ to generate the line pressure $P_L$ based on the desired speed changer ratio $I_0$, and delivers the line pressure $P_L$ to the cylinder chamber 33 of the secondary pulley 30 and the speed ratio control valve 221.

Similarly, the pressure control section 220 controls the step motor 222 according to the pulse signal $S_m$ from the control unit 1, so that the spool 221a of the speed ratio control valve 221 is driven by the link member 223 together with the feedback member 22a. Thus, the speed ratio control valve 221 controls the line pressure $P_L$ to generate the speed ratio control pressure $P_c$ based on the desired speed ratio $I_0$, and delivers the speed ratio control pressure $P_c$ to the cylinder chamber 23 of the primary pulley 20.

The operation of the above-described embodiment will be explained below with reference to FIG. 3, which is a flowchart of a control program executed by the control unit 1. It is noted that the control program is executed in order to control the speed ratio of the transmission for attaining the desired speed ratio $I_0$ calculated from signals indicating the transmission operating condition, such as engine speed $N_e$, primary rotation speed $N_{pri}$, secondary rotation speed $N_{sec}$, select position $S_p$, throttle valve opening degree TVO, oil temperature T, etc.

The control unit 1 judges at step S10 whether or not the transmission operating condition is within a control range allowing a lowering control of the line pressure. The transmission operating conditions are indicated by the above-mentioned signals, i.e., engine speed $N_e$, primary rotation speed $N_{pri}$, secondary rotation speed $N_{sec}$, select position $S_p$, throttle valve opening degree TVO, oil temperature T, etc.

Figure 3:
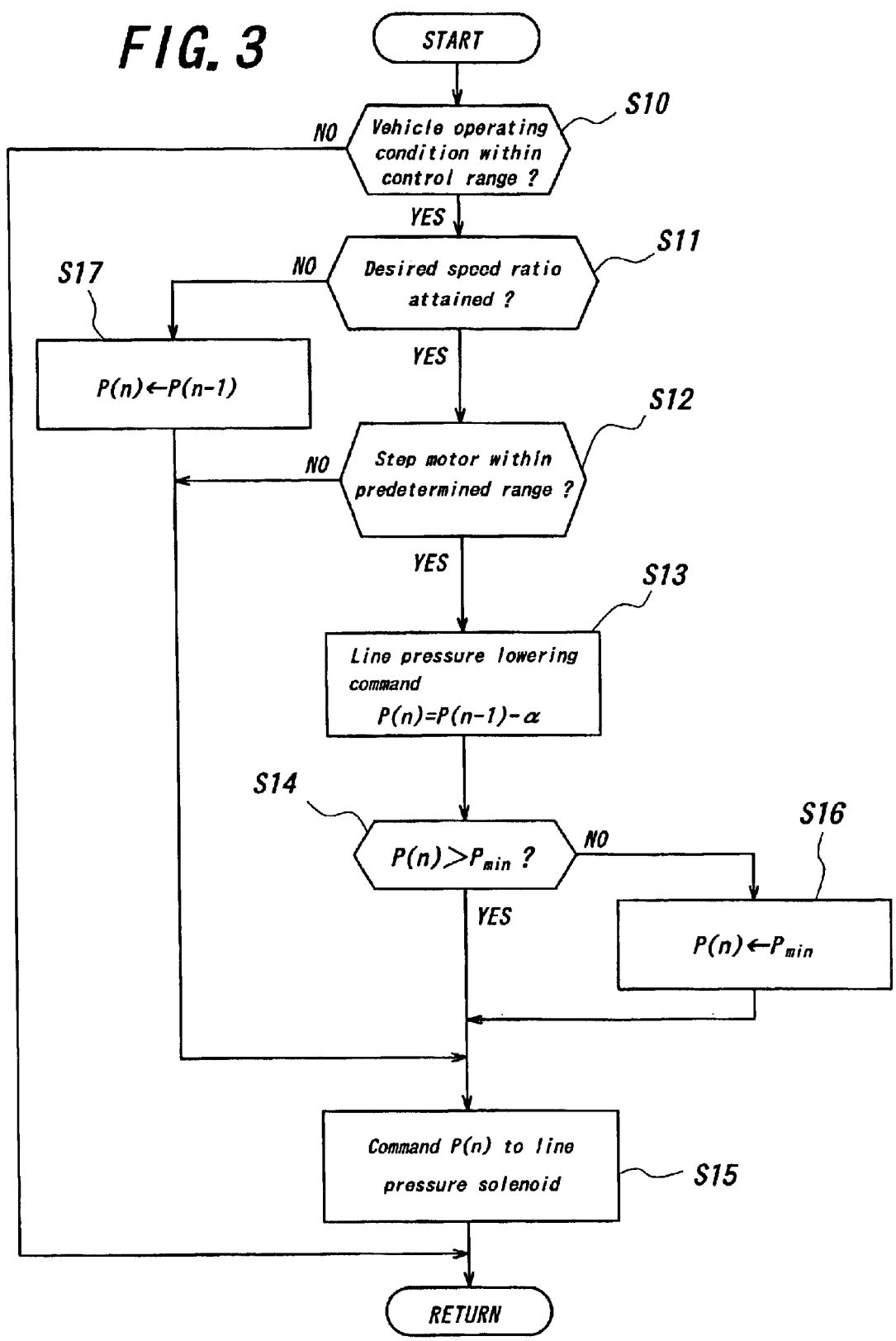
FIG. 3 is a flowchart of the control program executed by a control unit in the embodiment of FIG. 1.

If it is judged at step S10 that the transmission operating condition is not within the control range, the control is directly returned so as to continue the control according to the flowchart of FIG. 3. On the contrary, if it is judged at step S10 that the transmission operating condition is within the control range, the control proceeds to step S11 where judgment is made as to whether the desired speed ratio is attained. Thus, it is judged at step S11 whether or not the actual speed ratio I is attaining the desired speed ratio $I_0$ that is calculated from the signals indicating the transmission operating condition.

In this case, the actual speed ratio I is calculated, for example, from the primary rotation speed $N_{pri}$ detected by the primary speed sensor 5, and the secondary rotational speed $N_{sec}$ detected by the secondary speed sensor 6. The actual speed ratio I is compared with the desired speed ratio $I_0$ so as to judge whether or not the actual speed ratio I is attaining the desired speed ratio $I_0$.

If it is judged at step S11 that the actual speed ratio I is attaining the desired speed ratio $I_0$, the control proceeds to step S12 where the replacement position of the step motor 222 is detected. Thus, it is judged at step S12 whether or not the displacement position X of the step motor 222, which is driven by the pulse signal $S_m$ based on the desired speed ratio $I_0$, is within a predetermined range that can be normally taken in the case of a speed ratio control carried out under normal conditions.

If it is judged at step S12 that the displacement position X of the step motor 222 is within the predetermined range, it is determined that actual speed ratio I is attaining the desired speed ratio I0 without unreasonably operating the step motor 222, so that the control proceeds to step S13 in order to lower the line pressure PL.

However, if it is judged at step S12 that the displacement position X of the step motor 222 is not within the predetermined range, it is determined that the actual speed ratio I is attaining the desired speed ratio with unreasonable operation of the step motor 222, so that the control proceeds to step S15 without lowering the line pressure.

At step S13, the control unit 1 sets the duty ratio signal D delivered to the line pressure solenoid 212, so that the line pressure P(n) supplied from the line pressure regulator valve 211 becomes lower than the line pressure P(n−1) previously supplied from the line pressure regulator valve 211 by a lowering margin or a drop margin α, that is:

$$P(n)=\{P(n-1)-\alpha\}$$

and the control proceeds to step S14.

At step S14, the line pressure P(n) set at step S13 is compared with a lower limit value $P_{min}$ that can be changed for various operating conditions within a range where it can function as the line pressure $P_L$, so as to judge whether or not the line pressure $P_L(n)$ is lower than the lower limit value $P_{min}$. It is noted that the lower limit value $P_{min}$ is set, for example, to a minimum level sufficient to ensure power transmission by the V-belt 40 between the primary pulley 20 and the secondary pulley 30.

If it is judged at step S14 that the line pressure $P_L(n)$ is not lower than the lower limit value $P_{min}$, the control proceeds to step 15 where the control unit 1 delivers the duty ratio signal D to the line pressure solenoid 212 so as to cause the line pressure regulator valve 211 to supply the line pressure P(n).

However, it is judged at step S14 that the line pressure $P_L(n)$ is lower than the lower limit value $P_{min}$, the control proceeds to step S16 where the control unit 1 sets the duty ratio signal D so as to cause the line pressure P(n) delivered from the line pressure regulator valve 211 to become equal to the lower limit value $P_{min}$. Then, the control proceeds to step S15.

At step S15, the control unit 1 delivers the duty ratio signal D to the line pressure solenoid 212. The control is then returned to step S10 so as to continue the control following the flowchart of FIG. 3. On this occasion, if it is not judged at step S11 that the actual speed ratio I is attaining the desired speed ratio $I_0$, the control proceeds to step S17 where the control unit 1 sets the duty ratio signal D delivered to the line pressure solenoid 212 so as to return the line pressure $P_L(n)$ supplied from the line pressure regulator valve 211 to the line pressure $P_L(n-1)$ which was previously delivered from the line pressure regulator valve 211. Then, the control proceeds to step S15.

It will be appreciated from the foregoing description that the pressure control system for a belt-type continuously variable transmission according to the illustrated embodiment judges whether or not the actual speed ratio I is attaining the desired speed ratio $I_0$ at step S11, and then lowers the line pressure $P_L(n)$ to a pressure $P(n)=\{P(n-1)-\alpha\}$ at step S13. Thus, the line pressure $P_L$ supplied to the primary pulley 20 and the secondary pulley 30 can be restrained to a low value while the actual speed ratio I is attaining the desired speed ratio $I_0$.

Thus, the illustrated embodiment makes it possible to effectively eliminates drawbacks caused when an excessively high line pressure $P_L$ is supplied from the oil pump 2 while an actual speed ratio I of the transmission is attaining the desired speed ratio $I_0$, such as energy loss, degraded fuel consumption, etc.

In particular, with reference to steps 11 and 17 in FIG. 3, if it is judged that the actual speed ratio I is attaining the desired speed ratio $I_0$ with the line pressure PL determined at step S13, the present line pressure P(n) is returned to the previous line pressure P(n−1), so as to easily maintain a low line pressure $P_L=P(n)$ with which the actual speed ratio I can attain the desired speed ration $I_0$, while minimizing degradation of the fuel consumption and allowing a stable speed ratio control at any time.

Moreover, with reference to step 12 in FIG. 3, if it is judged that the displacement position X of the step motor 222 for controlling the speed ratio control pressure $P_c$ supplied to the primary pulley 20 is not within the predetermined range, the line pressure $P_L$ is not lowered even if it is judged at step 11 that the actual speed ratio I is attaining the desired speed ratio $I_0$. The lowering of the line pressure is thus prohibited in anticipation of change in the groove width of the primary pulley 20 and the secondary pulley 30, which would be caused if the line pressure $P_L$ were lowered, giving priority to maintenance of the current situation wherein the actual speed ratio I is attaining the desired speed ratio $I_0$, rather than to improvement in the fuel consumption, thereby ensuring a stable speed ratio control not only during the current control present operation but also during subsequent control operations.

Furthermore, in the illustrated embodiment, the lowering margin α set at step 13 in FIG. 3 may be a predetermined fixed value, though it is preferably variable according to the transmission operating condition as judged at step 10 from the engine speed $N_e$, primary rotation speed $N_{pri}$, secondary rotation speed $N_{sec}$, select position $S_p$, throttle valve opening degree TVO, oil temperature T, etc.

If the lowering margin α is made variable according to the transmission operating condition, the lowering margin α for the line pressure PL can be determined in view the operating condition which can be judged from the above-mentioned parameters. In this instance, since the line pressure $P_L$ can be rapidly lowered in view of the transmission operating condition, a long operation time with a lower line pressure $P_L$ can be ensured, thereby making it possible to improve the fuel consumption.

Figure 4:
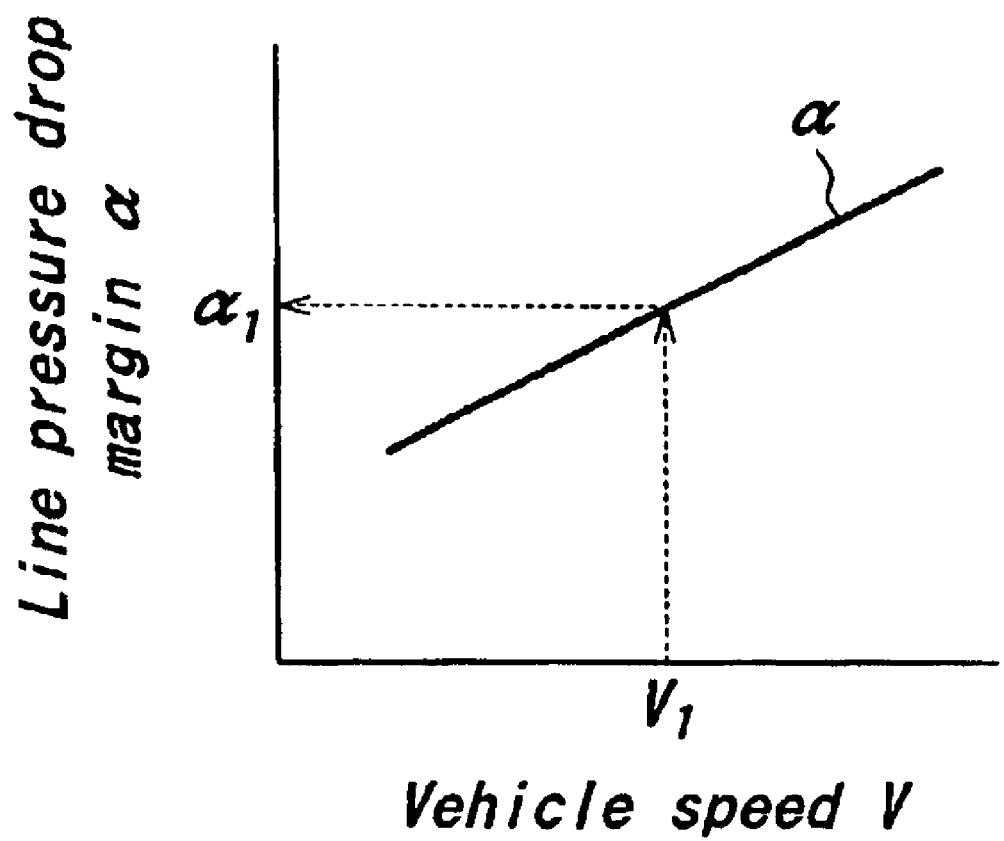
FIG. 4 is a map for determining a lowering, or drop, margin, which is variable according to a transmission operating condition, in the embodiment of FIG. 1.

FIG. 4 is a map showing that the lowering margin α is variable according to an operating condition as represented by the vehicle speed V. It is noted that the vehicle speed V can be calculated, for example, from the secondary rotation speed $N_{sec}$ detected from the secondary rotation sensor 6. In this instance, the lowering margin α is $\alpha_1$ when the vehicle speed V is $V_1$. The map is set so that the greater the vehicle speed, the greater the lowering margin α. This means that the line pressure $P_L$ can be lowered primarily in a high speed driving range where the improvement in fuel consumption is highly important.

Moreover, with reference to steps 14 and 16 in FIG. 3, since the lower limit value $P(n)=P_{min}$ is set for lowering of the line pressure $P_L$, it is possible to lower the line pressure $P_L$ supplied to the variable pulleys 20, 30 and the speed ratio control valve 221 and thereby eliminate the drawbacks that arise from a high line pressure supplied while the current speed ratio I is attaining the desired speed ratio $I_0$, and also to supply line pressure $P_L$ meeting with various requirements imposed depending upon specification of vehicles, by appropriately changing the lower limit value $P_{min}$ for lowering the line pressure $P_L$.

In particular, with reference to step 14 in FIG. 3, when the lower limit value $P_{min}$ for lowering the line pressure $P_L$ is set to a minimum pressure that allows power transmission by the V-belt member 40 between the primary pulley 20 and the secondary pulley 30, it is possible positively to prevent the line pressure $P_L$ from lowering to a level insufficient to attain the desired speed ratio $I_0$, due to some reason or other. Since at least the desired speed ratio can be positively attained, it is possible to carry out a stable control of the speed ratio.

While the present invention has been described above with reference to specific embodiments shown in the accompanying drawings, they were presented for illustrative purpose only, and various changes or modifications may be made without departing from the scope of the invention as defined by the appended claims. Thus, for example, the present invention may be applied to a belt-type continuously variable transmission for a so-called hybrid vehicle incorporating an engine and a motor as a power source of the vehicle. In this instance, the speed ratio changing mechanism 100 may be coupled to the motor as the drive source of the vehicle. Furthermore, the oil pump 2 may be driven not only by an engine but also by the above-mentioned motor as the drive source of the vehicle or a motor exclusive for the pump 2.

What is claimed is:

1. A hydraulic pressure control system for a belt-type continuously variable transmission including a speed ratio control mechanism composed of two variable pulleys each having a belt groove with a width that can be changed according to a hydraulic pressure, and a belt member passed over the variable pulleys in engagement with the belt grooves of the variable pulleys so as to transmit power therebetween; wherein said hydraulic pressure control system comprises a line pressure control means for controlling a line pressure supplied to one of the variable pulleys; and a speed ratio control pressure control means for controlling the line pressure as a speed ratio change pressure supplied to the other of the variable pulleys according to a desired speed ratio; said line pressure control means comprising a first detecting means for detecting whether or not an actual speed ratio has reached the desired speed ratio, and operable to lower the line pressure with a predetermined drop marain, if the first detecting means detects that the actual speed ratio has reached the desired speed ratio, wherein said detection of whether or not an actual speed ratio has reached the desired speed ratio and said lowering of the line pressure are performed as a routine, said routine being repeated until said actual speed ratio becomes short of said desired speed ratio.

2. The control system according to claim 1, wherein the line pressure control means returns a current line pressure to a previous line pressure if the first detecting means does not detect that the actual speed ratio reached the desired speed ratio.

3. The control system according to claim 1, wherein the line pressure control means further comprises a second detecting means for detecting whether or not a displacement position of a step motor for controlling the speed ratio control pressure is within a predetermined range, so as to prohibit lowering of the line pressure if the second detecting means detects that the displacement position of the step motor which is out of the predetermined range, even if the first detecting means detects that the actual speed ratio has reached the desired speed changer ratio.

4. The control system according to claim 1, wherein the line pressure control means is adapted to change said drop margin for lowering the line pressure, according to a transmission operating condition.

5. The control system according to claim 4, wherein the line pressure control means increases said drop margin according to increase in a vehicle speed.

6. The control system according to claim 1, wherein a lower limit value is set for lowering the line pressure.

7. A hydraulic pressure control system for a belt-type continuously variable transmission including a speed ratio control mechanism composed of two variable pulleys each having a belt groove with a width that can be changed according to a hydraulic pressure, and a belt member passed over the variable pulleys in engagement with the belt grooves of the variable pulleys so as to transmit power therebetween; wherein said hydraulic pressure control system comprises a line pressure controller for controlling a line pressure supplied to one of the variable pulleys; and a speed ratio control pressure controller for controlling the line pressure as a speed ratio change pressure supplied to the other of the variable pulleys according to a desired speed ratio; said line pressure controller comprising a first detector for detecting whether or not an actual speed ratio has reached the desired speed ratio, and operable to lower the line pressure with a predetermined drop margin, if the first detector detects that the actual speed ratio has reached the desired speed ratio, wherein said detection of whether or not an actual speed ratio has reached the desired speed ratio and said lowering of the line pressure are performed as a routine, said routine being repeated until said actual speed ratio becomes short of said desired speed ratio.

8. The control system according to claim 7, wherein the line pressure controller returns a current line pressure to a previous line pressure if the first detector does not detect that the actual speed ratio reached the desired speed ratio.

9. The control system according to claim 7, wherein the line pressure controller further comprises a second detector for detecting whether or not a displacement position of a step motor for controlling the speed ratio control pressure is within a predetermined range, so as to prohibit lowering of the line pressure if the second detector detects that the displacement position of the step motor which is out of the predetermined range, even if the first detector detects that the actual speed ratio has reached the desired speed changer ratio.

10. The control system according to claim 7, wherein the line pressure controller is adapted to change said drop margin for lowering the line pressure, according to a transmission operating condition.

11. The control system according to claim 10, wherein the line pressure controller increases said drop margin according to increase in a vehicle speed.

12. The control system according to claim 7, wherein a lower limit value is set for lowering the line pressure.

* * * * *